(12) United States Patent
Hedberg

(10) Patent No.: US 11,630,022 B2
(45) Date of Patent: Apr. 18, 2023

(54) GAS QUANTIFICATION SYSTEMS AND METHODS

(71) Applicant: FLIR Systems AB, Täby (SE)

(72) Inventor: Hugo Hedberg, Taby (SE)

(73) Assignee: FLIR SYSTEMS AB, Taby (SE)

( * ) Notice: Subject to any disclaimer, the term of this patent is extended or adjusted under 35 U.S.C. 154(b) by 709 days.

(21) Appl. No.: 16/710,953

(22) Filed: Dec. 11, 2019

(65) Prior Publication Data

US 2020/0116583 A1 Apr. 16, 2020

Related U.S. Application Data

(63) Continuation of application No. PCT/US2018/036974, filed on Jun. 11, 2018.

(60) Provisional application No. 62/518,471, filed on Jun. 12, 2017.

(51) Int. Cl.
| | | |
|---|---|---|
| *G01M 3/00* | (2006.01) | |
| *G06T 7/269* | (2017.01) | |
| *G06T 7/13* | (2017.01) | |
| *G06T 7/70* | (2017.01) | |
| *G01M 3/04* | (2006.01) | |
| *G01N 21/3504* | (2014.01) | |
| *H04N 5/33* | (2023.01) | |

(52) U.S. Cl.
CPC .............. *G01M 3/002* (2013.01); *G01M 3/04* (2013.01); *G01N 21/3504* (2013.01); *G06T 7/13* (2017.01); *G06T 7/269* (2017.01); *G06T 7/70* (2017.01); *H04N 5/33* (2013.01); *G01N 2021/3531* (2013.01); *G06T 2207/10048* (2013.01)

(58) Field of Classification Search
None
See application file for complete search history.

(56) References Cited

U.S. PATENT DOCUMENTS

| | | | |
|---|---|---|---|
| 3,069,654 A | 12/1962 | Hough | |
| 7,082,370 B2 | 7/2006 | Ardo et al. | |
| 2014/0008526 A1* | 1/2014 | Zeng ......................... | G01J 5/53 250/252.1 |
| 2016/0097713 A1* | 4/2016 | Kester ...................... | G01M 3/38 356/51 |

(Continued)

FOREIGN PATENT DOCUMENTS

| | | |
|---|---|---|
| EP | 1512955 | 3/2005 |
| JP | 2002296142 | 10/2002 |

(Continued)

OTHER PUBLICATIONS

Jonas Sandsten et al: "Volume flow calculations on gas leaks imaged with infrared gas-correlation", Optics Express, Aug. 20, 2012 (Aug. 20, 2012), pp. 20318-20329.

(Continued)

*Primary Examiner* — Gelek W Topgyal
(74) *Attorney, Agent, or Firm* — Haynes & Boone, LLP

(57) ABSTRACT

Various techniques are disclosed to provide a quantification of a gas leak based on an image of a gas plume generated by the leak. An image location that corresponds to the origin of the gas leak is determined. An exit border is disposed on the image based on the image location that corresponds to the origin of the gas leak. A gas leak rate is computed based at least on gas concentration values of the pixels that overlap the exit border.

20 Claims, 10 Drawing Sheets

(56) References Cited

U.S. PATENT DOCUMENTS

| | | | |
|---|---|---|---|
| 2017/0097274 A1* | 4/2017 | Thorpe | G01B 21/20 |
| 2017/0284887 A1* | 10/2017 | Miranda | H04N 9/31 |
| 2019/0154536 A1* | 5/2019 | Wang | G01M 3/38 |
| 2019/0339158 A1* | 11/2019 | Yanai | G01M 3/002 |

FOREIGN PATENT DOCUMENTS

| | | |
|---|---|---|
| JP | 2002296142 A * | 10/2002 |
| WO | WO 2016/139261 A1 | 9/2016 |
| WO | WO 2016/208317 | 12/2016 |
| WO | WO-2016208317 A1 * | 12/2016 |

OTHER PUBLICATIONS

Jonas Sandsten et al: "Gas visualization of industrial hydrocarbon emissions", Optics Express 1443, vol. 12, No. 7, Apr. 5, 2004 (Apr. 5, 2004), 9 pages.

R. O. Duda and P. E. Hart, "Use of the Hough Transformation to Detect Lines and Curves in Pictures," Comm. ACM, vol. 15, pp. 11-15, 1972.

G. Farnebäck, "Two-Frame Motion Estimation Based on Polynomial Expansion," in Proceedings of the 13th Scandinavian Conference on Image Analysis, Gothenburg, 2003.

C. Stauffer and W. Grimson, "Adaptive background mixture models for real-time tracking," in Conference on Computer Vision and Pattern Recognition, Fort Collins, 1999.

Jonas Sandsten et al., "Real-time gas-correlation imaging employing thermal background radiation", Optical Society of America, vol. 6, No. 4, Optics Express 92, Feb. 2000, 12 pages.

* cited by examiner

GAS QUANTIFICATION SYSTEMS AND METHODS

CROSS-REFERENCE TO RELATED APPLICATIONS

This application is a continuation of International Patent Application No. PCT/US2018/036974 filed Jun. 11, 2018 and entitled "GAS QUANTIFICATION SYSTEMS AND METHODS," which is incorporated herein by reference in its entirety.

International Patent Application No. PCT/US2018/036974 filed Jun. 11, 2018 claims priority to and the benefit of U.S. Provisional Patent Application No. 62/518,471 filed Jun. 12, 2017 and entitled "GAS QUANTIFICATION SYSTEMS AND METHODS," which is hereby incorporated by reference in its entirety.

TECHNICAL FIELD

One or more embodiments of the invention relate generally to quantification of gas in a gas leak and, in particular, to quantification of gas leak based on analysis of infrared images.

BACKGROUND

Thermal, or infrared (IR), images of scenes are often useful for monitoring, inspection, and/or maintenance purposes, for example, for monitoring gas leaks at an industrial plant. Typically, a thermal imaging device, such as an infrared IR camera, can capture IR image data representing infrared radiation emitted from an observed scene. The captured IR image can be processed, displayed and/or stored away, for example in the thermal imaging device or in a computing device connected to the thermal imaging device such as a tablet computer, a smartphone, a laptop or a desktop computer.

Thermal imaging devices, such as IR cameras, might be used for detecting gas occurrence, for example in the form of a gas cloud or gas plume, and for producing a visual representation of such gas occurrence as a gas infrared image. Such a gas infrared image can be used for visualizing gas occurrence or gas leaks. However, there is a need for improved techniques for measuring or quantifying a gas leak rate.

SUMMARY

Various techniques are disclosed for providing a quantification of a gas leak based on an image of a gas plume generated by the leak. The image, for example, may be an infrared (IR) image of the gas plume. In one aspect, a gas quantification system is provided. The system includes a non-transitory memory and one or more hardware processors coupled to the non-transitory memory, wherein the one or more hardware processors are configured to read instructions from the non-transitory memory to cause the gas quantification system to perform operations comprising: obtaining an image of a gas plume of a gas leak within a scene, wherein each pixel within the image indicates a gas concentration value corresponding to an area within the scene, determining a location on the image corresponding to an origin of the gas leak, disposing an exit border on the image based on the determined location of the origin of the gas leak, wherein the exit border extends across at least a cross section of the gas plume, and computing a first gas leak rate for the gas leak based at least on the gas concentration values of the pixels overlapping the exit border.

In another aspect, a method for quantifying a gas leak is provided. The method includes obtaining, from an infrared camera, an image of a gas plume of a gas leak within a scene, wherein each pixel within the image indicates a gas concentration value corresponding to an area within the scene, determining a location on the image corresponding to an origin of the gas leak, disposing an exit border on the first image based on the determined location of the origin of the gas leak, wherein the exit border extends across at least a cross section of the gas plume, and computing a gas leak rate for the gas leak based at least on the gas concentration values of the pixels overlapping the exit border.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
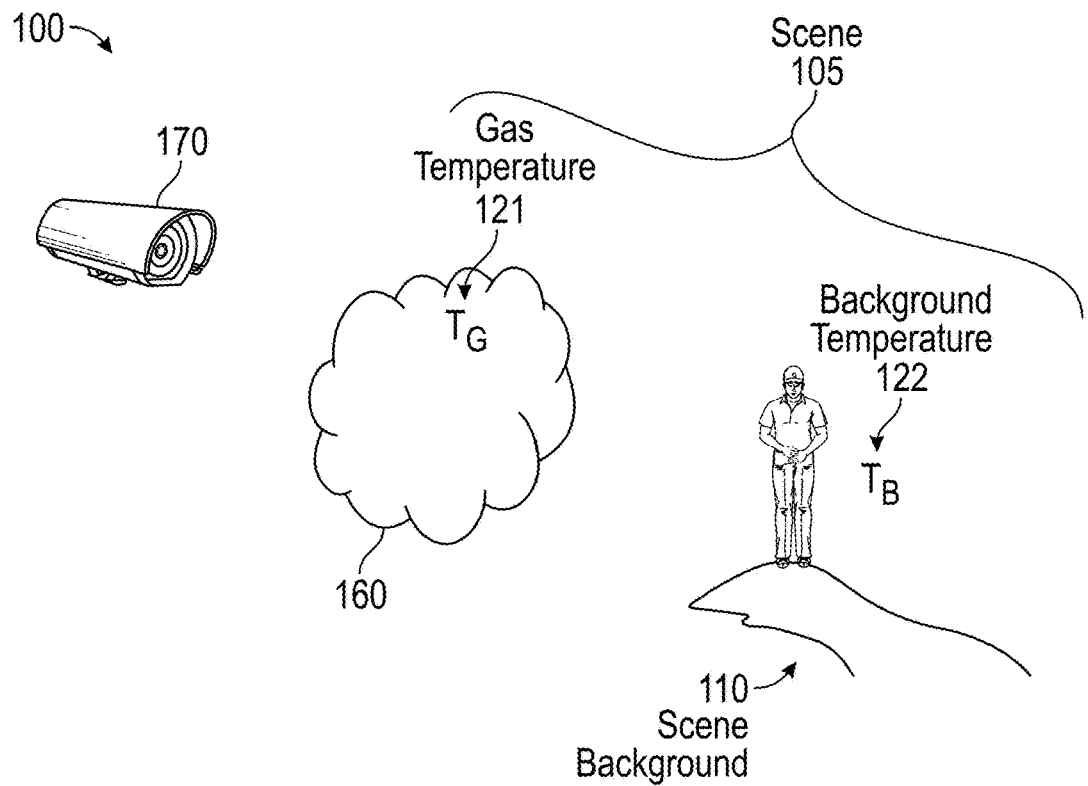
FIG. 1 illustrates an operating environment in which a thermal imaging device may operate in accordance with an embodiment of the disclosure.

Various embodiments of the methods and systems disclosed herein may be used to provide a quantification of a gas leak (e.g., a gas leak rate) based on an image of a gas plume generated by the leak. The image, for example, may be an infrared (IR) image (e.g., a thermal image) of the gas plume. The image may be captured by an image device (e.g., an IR camera). In such embodiments, the image includes a plurality of pixels with associated IR radiance values. Each of the IR radiance values may in turn be used to determine a gas concentration value for the corresponding pixel.

A location on the image that corresponds to an origin of the gas leak may be determined by analyzing the IR radiance values of the image. Pixels that correspond to the representation of the gas plume may also be identified using a segmentation technique that separate potential (e.g., candidate) gas pixels from background pixels.

One or more lines that intersect the origin of the gas leak and extend, in straight line to one or more candidate gas pixels may be generated. For each line, a saturated region, where gas concentration values may be saturated, and a non-saturated region, where gas concentration values may be optically thin (i.e., not saturated), may be determined. For example, a logarithmic region, which may represent the saturated region, and a linear region, which may represent the optically thin region, for each line may be determined based on the change (or the rate of change) in the gas concentration values of the pixels along the line. The rate of change in the gas concentration values in the logarithmic region is substantially similar to a logarithmic curve, while the rate of change in the gas concentration values in the linear region is substantially linear.

An exit border for the gas leak may be generated and placed on the linear region of the image. The exit border extends across at least a cross section of the gas plume on the image, and overlaps at least a pixel in the linear region of a vector. In some embodiments, the exit border may be implemented in the form of an arc. The arc may be part of a circle centering at the location of the image that corresponds to the origin of the gas leak. The radius of the circle may be determined to be sufficiently large such that at least one pixel that overlaps the arc is in the linear region. Preferably, more than half of the pixels that overlap the arc are in the linear region. Even more preferably, more than 90% of the pixels that overlap the arc are in the linear region. In one embodiment, all of the pixels that overlap the arc are in the linear region.

According to various embodiments, only pixels that overlap with the exit border are analyzed to determine the gas leak rate, which advantageously reduce computational complexity. In these embodiments, for each pixel that overlap the exit border, an optical flow velocity vector may be computed based on the gas concentration value of the pixel. In some embodiments, multiple images may be used for computing the optical flow velocity vectors. For example, a second, subsequent image may be captured of the gas plume and the gas concentration values of the two images are used to compute the optical flow velocity vectors. The optical flow velocity vectors, along with parameters (e.g., the instantaneous field of view (IFOV), a distance between the imaging device and the gas leak, etc.) of the imaging device that captured the image may be used to compute a gas leak rate for the gas leak.

Multiple gas leak rates may be calculated based on multiple image frames (e.g., 30 frames, 60 frames, etc.) captured of the gas leak sequentially in time. A final gas leak rate may then be determined by calculating a sliding mean of several gas leak rates computed based on the techniques described herein.

FIG. 1 illustrates an example gas leak 160 being captured by an IR imaging device 170 according to one embodiment of the disclosure may operate. IR imaging device 170 is adapted to capture IR radiation within one or more selected wavelength bands and thus to produce infrared images (also referred to as "IR images" or "thermal images"), representing a particular selected wavelength band of IR radiation from a scene 105. In some embodiments, IR imaging device 170 comprises a dual waveband detector, in which case, IR imaging device 170 is adapted to capture IR radiation within two selected wavelength bands to produce IR images representing the two particular selected wavelength bands of IR radiation from scene 105. For example, a dual waveband detector for IR imaging device 170 may be implemented according to the techniques disclosed in International Patent Application Publication No. WO 2016/139261 entitled "Wavelength Band Based Passive Infrared Gas Imaging," which is incorporated herein by reference in its entirety. IR images of two particular selected wavelength bands captured by such a dual waveband detector may be further processed and/or analyzed to detect or visualize gas leaks more clearly and accurately as described in, for example, International Patent Application Publication No. WO 2016/139261 referenced above.

Scene 105 comprises a scene background 110 and gas 160 in the form of a gas plume in between scene background 110 and IR imaging device 170. Gas 160 may be generated from a gas leak in a facility. In this example, gas 160 is illustrated in the shape of a gas cloud. Scene background 110 has a background temperature $T_B$ 122, and gas 160 has a gas temperature $T_G$ 121. It is noted that a temperature difference $\Delta T$ 130 between background temperature $T_B$ 122 gas temperature $T_G$ 121 exists as a result of gas 160 absorbing or emitting thermal energy.

In accordance with one or more embodiments, IR imaging device 170 is configured to capture thermal radiation of scene 105 and generate an IR image representing the thermal radiation from scene 105. The thermal radiation of scene 105 includes thermal radiation from scene background 110 (represented as $T_B$ 122) in combination with thermal radiation emitted and/or absorbed by gas 160 (represented as $T_G$ 121).

Specifically, IR imaging device 170 according to one or more embodiments of the disclosure generates an IR image of scene 105 by capturing thermal radiation from various parts of the scene that hit the imaging sensor of IR imaging device 170. Thermal radiation from different areas of the scene hits different areas on the imaging sensor. As such, some parts of the IR image representing the portion of scene 105 without any obscurity from gas 160 may include thermal radiation information based on the thermal radiation solely emitted from scene background 110. On the other hand, other parts of the IR image representing the portion of the scene 105 that is obscured by gas 160 may include thermal radiation information based on both the thermal radiation emitted from scene background 110 along with the characteristics of gas 160 to absorb and/or emit thermal radiation.

Figure 2:
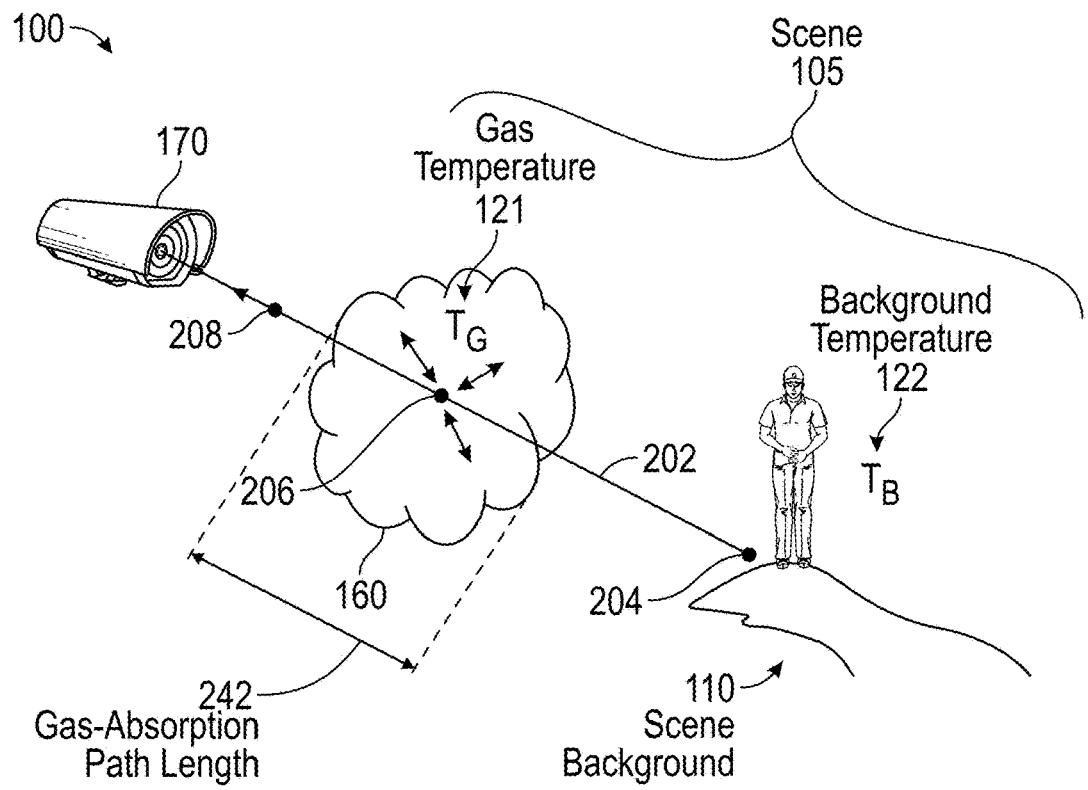
FIG. 2 illustrates an exemplary IR radiation path from a scene to a thermal imaging device within an operating environment in accordance with an embodiment of the disclosure.

FIG. 2 illustrates, within scene 105, a thermal radiation path 202 from scene background 110 through gas 160 before hitting the imaging sensor of IR imaging device 170. As shown, thermal energy or IR radiation emitted from scene background 110 travels from an edge of scene background 110 at location 204, along the first section of the thermal radiation path 202 before hitting gas plume 160. Once the IR radiation enters into gas plume 160, e.g., at location 206, IR radiation 204 undergoes a change. In the situation where gas 160 has the characteristics of absorbing IR radiation within a wavelength band, some of the IR radiation is being absorbed by gas 160, and as such, the radiance level of the IR radiation within the wavelength band gradually reduces while the IR radiation is traveling within gas plume 160, resulting in a reduced IR radiation as it exits gas plume 160 (e.g., at location 208) before hitting the imaging sensor of IR imaging device 170. As a result, only a fraction of the thermal energy or IR radiation emitted from scene background 110 reaches the imaging sensor of IR imaging device 170. It is noted that different types of gas may absorb thermal energy or IR radiation in different wavelength bands. For example, methane ($CH_4$) has the characteristics of absorbing thermal energy or IR radiation in a wavelength band between 7.0 microns (μm) and 8.5 μm. Another type of gas might have the characteristics of absorbing thermal energy or IR radiation in a different wavelength band.

Figure 3A:
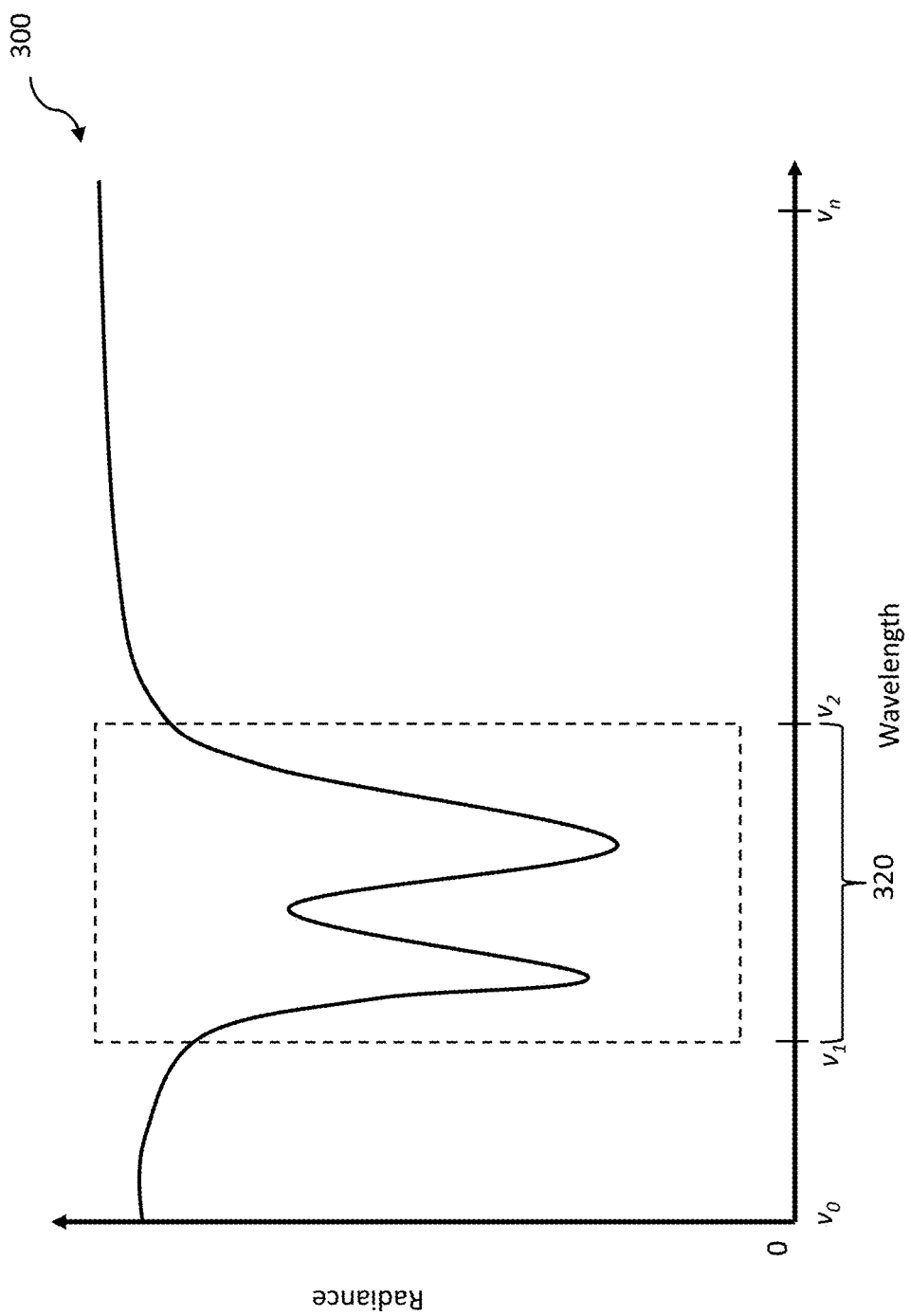
FIG. 3A illustrates examples of radiance levels as a function of wavelength for detected IR radiation that goes through a gas plume that absorbs thermal energy in accordance with an embodiment of the disclosure.

Graph 300 of FIG. 3A illustrates detected radiance levels of the thermal energy or IR radiation, which comes through thermal radiation path 202 in scene 105 when gas 160 has the characteristics of absorbing thermal energy, as a function of wavelengths. As shown, the radiance level is substantially even across the wavelengths except in the wavelength band 320 between $v_1$ and $v_2$. The dip of the detected radiance level in the wavelength band 320 between $v_1$ and $v_2$ is caused by the absorption of thermal energy or IR radiation by gas 160. As such, if gas 160 includes a substantial large amount of methane for example, $v_1$ and $v_2$ would substantially correspond to 7.0 μm and 8.5 μm, respectively.

On the other hand, in the situation where gas 160 has the characteristics of emitting IR radiation within a wavelength band, additional IR radiation is being added to the IR radiation from scene background 110 while the IR radiation is within gas plume 160. As such, the radiance level of the IR radiation within the wavelength band gradually increases while the IR radiation is traveling through gas plume 160, resulting in an increased IR radiation as it exits gas plume 160 (e.g., at location 208) before hitting the imaging sensor of IR imaging device 170. As a result, the combined thermal energy or IR radiation emitted from scene background 110 and gas 160 reaches the imaging sensor of IR imaging device 170. It is noted that different types of gas may emit thermal energy or IR radiation in different wavelength bands.

Figure 3B:
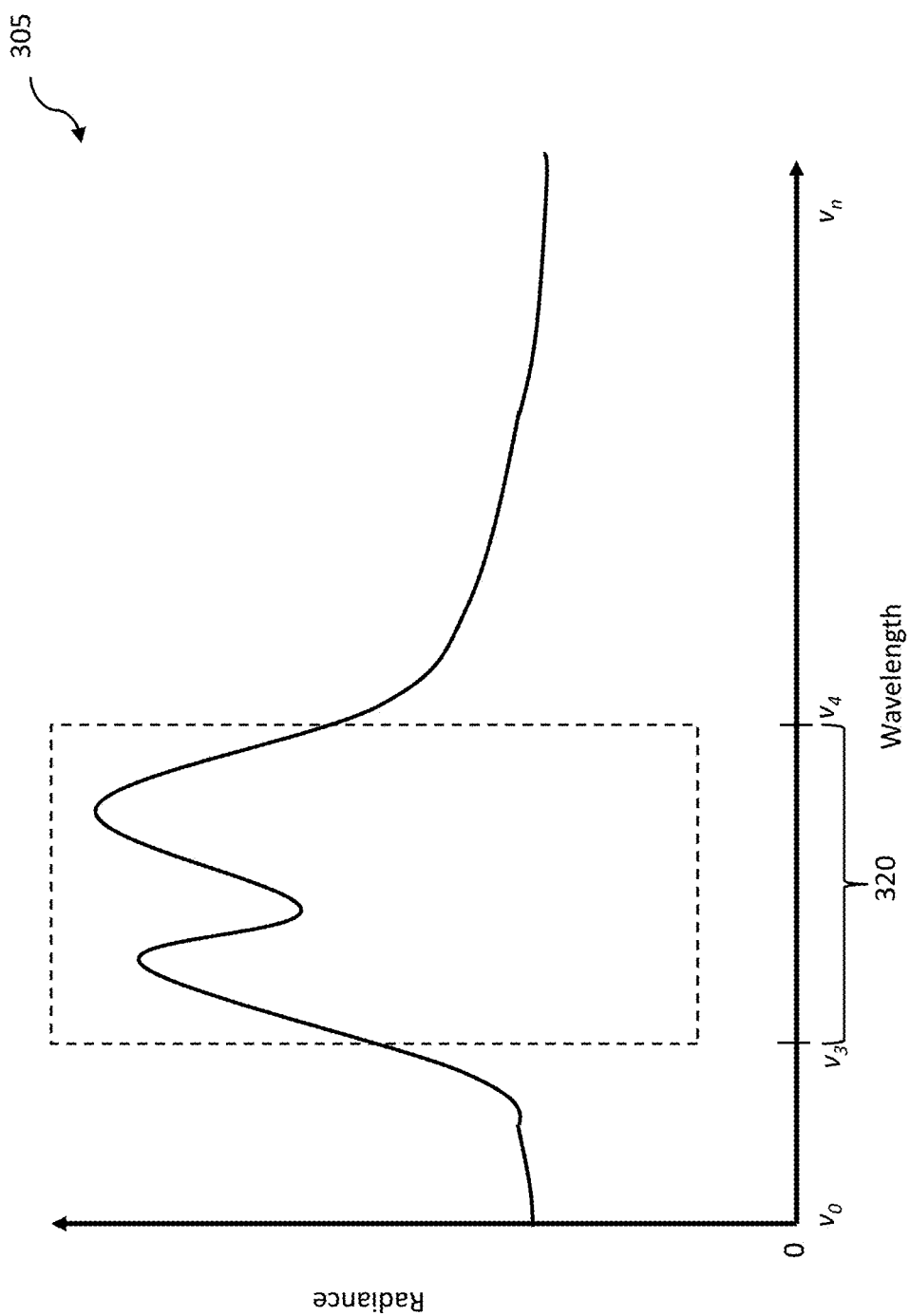
FIG. 3B illustrates examples of radiance levels as a function of wavelength for detected IR radiation that goes through a gas plume that emits thermal energy in accordance with an embodiment of the disclosure.

Graph 305 of FIG. 3B illustrates detected radiance levels of the thermal energy or IR radiation, which comes through thermal radiation path 202 in scene 105 when gas 160 has the characteristics of emitting thermal energy, as a function of wavelengths. As shown, the radiance level is substantially even across the wavelengths except in the wavelength band 320 between $v_3$ and $v_4$. The spike of the detected radiance level in the wavelength band 320 between $v_3$ and $v_4$ is caused by the thermal energy or IR radiation emitted by gas 160.

Thus, a radiation path that goes through a higher concentration of gas will experience a higher deviation of thermal energy from an ambient thermal energy (e.g., a higher increase or reduction in detected thermal energy) than a radiation path that goes through a lower concentration of gas. Accordingly, a gas concentration value may be determined based on the extent that the detected thermal energy of a particular path (that hits a particular sensor pixel, which corresponds to a particular pixel value of the resulting IR image) deviates from the ambient thermal energy. The ambient thermal energy is the detected thermal energy from a radiation path without going through the gas cloud.

Instead of capturing thermal energy or IR radiation across the entire IR spectrum, it has been contemplated that the sensitivity of an IR imaging device may be improved by capturing thermal energy or IR radiation within a narrower IR wavelength band. As such, an uncooled IR imaging device according to one embodiment of the disclosure includes various system parameters (e.g., optical and/or non-optical components) configured to allow a large percentage (e.g., greater than 90%) of infrared (IR) radiation within a narrow wavelength band (e.g., wavelength band 320 corresponding to an absorption or emission band of a gas of interest) from a scene to reach the imaging sensor of the IR imaging device, while substantially blocking IR radiation outside of the wavelength band from reaching the imaging sensor. In embodiments having a dual waveband detector, one selected waveband for the dual waveband detector may correspond to an absorption or emission band of a gas of interest (e.g., a waveband where high absorption or emission by the gas of interest occurs) and another selected waveband may correspond to a waveband where absorption or emission by the gas of interest is low.

Figure 4:
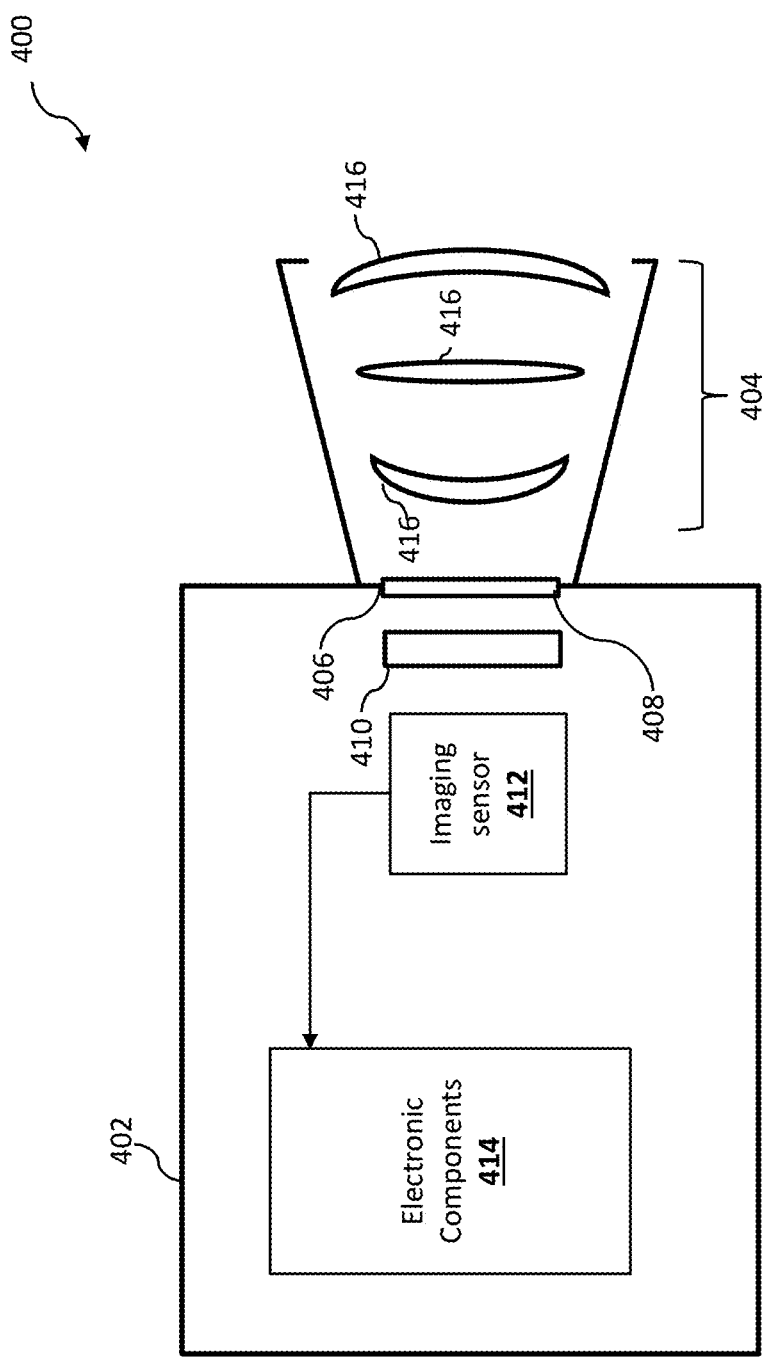
FIG. 4 is a schematic of a thermal imaging device in accordance with an embodiment of the disclosure.

FIG. 4 is a schematic of an example of such an IR imaging device 400. In some embodiments, IR imaging device 400 is a camera, and more specifically, an IR camera. Additionally, the IR imaging device 400 according to one embodiment of the disclosure is configured to be optimized for capturing IR radiation within one or more narrow wavelength bands corresponding to a type of gas. Preferably, the narrow wavelength band has a range of less than or equal to 2 μm. Even more preferably, the narrow wavelength band has a range of less than or equal to 1.5 μm. Depending on the type of gas that is of interest, IR imaging device 400 can be configured to capture IR image within a specific narrow wavelength band that corresponds to the gas in interest. For example, for capturing IR image of methane gas, IR imaging device 400 according to one or more embodiment of the disclosure can be configured (with various specific system parameters) to optimize in capturing IR radiation in the narrow wavelength band within a range between 7.0 μm and 8.5 μm.

In some embodiments, IR imaging device 400 has an enclosure 402 enclosing the various components of IR imaging device 400. As shown, IR imaging device 400 has a lens assembly 404, an inlet 406, a window 408, a filtering component 410, an imaging sensor 412, and other electronic components 414. Lens assembly 404 includes one or more lens elements 416, which together, are configured to optically focus a scene (e.g., scene 105) from the perspective of the location of imaging sensor 412. As such, the one or more lens elements 416 include refractive properties that redirect IR radiation from the scene (e.g., scene 105) to imaging sensor 412. In some embodiments, lens assembly 404 is fixed onto IR imaging device 170, while in other embodiments, lens assembly 404 is removable from IR imaging device 170 such that different lens assemblies may be attached to IR imaging device 170 for different purposes. For example, different lens assemblies with different focal lengths and/or zoom capabilities may be interchangeable for IR imaging device 170. In this example, lens assembly 404 has a specific focal length that defines a particular field of view (FOV) for IR imaging device 400. A coating, such as an anti-reflective coating, may be applied to each of the lens elements 416. The coating may have the property of reducing reflection of IR radiation from the lens element (that is, improving transmission efficiency of IR radiation through the lens element). Different coatings may have different anti-reflection characteristics. According to one or more embodiments of the disclosure, a coating that is optimized for reducing reflection for IR radiation within the narrow wavelength band of interest is selected to be applied on the lens elements 416. In some embodiments, the coating can be applied to one or both sides of each lens element 416. Preferably, a coating that allows more than 90% of IR radiation within the narrow wavelength band to transmit through the lens element 416 is selected. Even more preferably, a coating that allows more than 95% (or even 98%) of IR radiation within the narrow wavelength band to transmit through the lens element 416 is selected.

It is noted that no matter how efficient the lens elements (even with the coating as described above) are in transmitting IR radiation, each lens element reduces transmission of IR radiation to a certain extent. As such, it has been contemplated that as few as possible optical elements would be used in lens assembly 404. In some embodiments, lens assembly 404 includes five lens elements or less. It has been contemplated that lens assembly 404 may include two lens elements or less to further improve the transmission of IR radiation. In some embodiments, lens assembly 404 may comprise a lens position sensor (e.g., disposed relative to a focus ring of lens assembly 404) configured to determine a position of the lens elements that are adjustably moved to focus IR radiation from a desired distance onto imaging sensor 412. The position of the lens elements (e.g., the position of the focus ring) determined by the lens position sensor may be used to determine the distance from IR imaging device 400 to an object (e.g., gas plume 160) that IR imaging device 400 is focused on. In some embodiments, IR camera may comprise a rangefinder (e.g., a laser rangefinder) that is configured to determine the distance from IR imaging device 400 to an object (e.g., gas plume 160) in the scene.

IR imaging device 400 also includes a radiation inlet 406 disposed at a connection point with lens assembly 404. Radiation inlet 406 is an opening (a hole) through which IR radiation that is redirected by lens assembly 404 can enter into the interior of housing 402 and ultimately to imaging sensor 412. Preferably, radiation inlet 406 has an associated aperture (a size), and is, in some embodiments, substantially circular (e.g., 90%) in shape. The aperture of inlet 406 determines the amount of IR radiation that enters into enclosure 402 and reaches imaging sensor 412. In order to maximize the amount of the IR radiation from scene 105 to reach imaging sensor 412, a large aperture is selected for inlet 406. In some embodiments, the aperture has an fnumber (ratio of the focal length specified for lens assembly 404 to the diameter of the inlet 406) greater than or equal to f/2. Even more preferably, the aperture has an f number greater than or equal to f/1.5, and even more preferably, greater than or equal to f/1.0. In some embodiments, the aperture selected for inlet 406 is greater than or equal to f/0.6.

According to some embodiments of the disclosure, a window 408 is disposed at inlet 406. In some embodiments, window 408 covers the entire opening of inlet 406 such that IR radiation that is redirected by lens assembly 404 has to go through window 408 before reach other elements, such as imaging sensor 412, of IR imaging device 400 within enclosure 402. Window 408 can advantageously prevent external particles (e.g., dust) from entering into enclosure 402 that could potentially damage the electronic components of IR imaging device 400 and/or cause interference to capturing images of scene 105. Preferably, window 408 is made of a material that has a high efficiency of transmitting IR radiation within the particular narrow wavelength band. According to one embodiment of the disclosure, window 408 is made of Germanium.

In some embodiments, a coating, such as the type of coating described above by reference to the description of the lens elements, may be applied to one or both sides of window 408 to further improve the efficiency of transmitting IR radiation. According to one or more embodiments of the disclosure, the coating is optimized for reducing reflection for IR radiation within the particular narrow wavelength band.

It has been contemplated that passing only relevant IR radiation (e.g., the IR radiation within the particular narrow wavelength band) to imaging sensor 412 and eliminating other IR radiation from reaching imaging sensor 412 may further improve the quality of the image produced by IR imaging device 400 by increasing the signal-to-noise ratio of the image. As such, IR imaging device 400 according to some embodiments of the disclosure may also include a filtering component 410 disposed between window 406 and imaging sensor 412. Filtering component 410 is configured to allow only IR radiation within the particular narrow wavelength band to pass through while blocking IR radiation outside of the particular narrow wavelength band. Filtering component 410 may include one or more filters. In one example, filtering component 410 may include a cut-on filter configured to cut on at the shortest wavelength within the particular narrow wavelength band and a cut-off filter configured to cut off at the longest wavelength within the particular narrow wavelength band. The cut-on/cut-off filters may be made with materials and configuration that blocks off (or reflect) any light waves with wavelengths that are either below (in the case of a cut-on filter) or above (in the case of a cut-off filter) a certain wavelength. In some embodiments, filtering component 410 and window 408 are not separate elements, but instead they may be combined into one or more optical element that is configured to cover inlet 406 and optically filter the incoming IR radiation.

Imaging sensor 412, in some embodiments, may include an IR imaging sensor which may be implemented, for example, with a focal plane array (FPA) of bolometers, micro-bolometers, thermocouples, thermopiles, pyroelectric detectors, photodetectors (e.g., InSb or MCT detectors, or quantum well IR photodetectors) or other IR sensor elements responsive to IR radiation in various wavelengths such as for example, in the range between 1 micron and 14 microns. More specifically, the IR imaging sensor may include IR detectors configured to detect (e.g., responsive or sensitive to) short-wave IR (SWIR) in the 1 to 3 micron waveband, thermal IR waveband including mid-wave IR (MWIR) in the 3 to 8 micron waveband and long-wave IR (LWIR) in the 8 to 15 micron waveband, or any combination of these IR wavebands. In one example, imaging sensor 412 may be configured to capture images of a very narrow range of wavelengths in the thermal IR wavebands (MWIR, LWIR, or an overlapping waveband of MWIR and LWIR). For example, imaging sensor 412 may be configured to capture images of the particular narrow wavelength band (e.g., between 7.0 μm and 8.5 μm).

The current trend for IR imaging sensors is to increase the pixel count (to pack as many pixels as possible on a sensor having a fixed size). In order to increase pixel count on a sensor having a fixed size, the pixel pitch of each pixel (the distance between centers of adjacent pixels) has to be reduced. However, counter to what has been conventionally done, it has been contemplated that in order to maximize signal-to-noise ratio, a larger pixel pitch is preferred. According to some embodiments of the disclosure, imaging sensor 412 has pixels having pixel pitch of at least 20 μm. Even more preferably, imaging sensor 412 has pixels having pixel pitch of at least 25 μm. Having a larger pixel pitch allows each pixel to occupy a larger surface area of imaging sensor 412, thereby increasing the area for detecting IR radiation.

Furthermore, similar to lens elements 416 and window 406, a coating may be applied to each individual pixel (detector) in imaging sensor 412. According to one or more embodiments of the disclosure, a coating that is optimized for reducing reflection for IR radiation within the narrow wavelength band is selected to be applied on the lens elements 416. In some embodiments, the coating applied to the pixels is the same coating applied to lens elements 416 and window 406.

Figure 5:
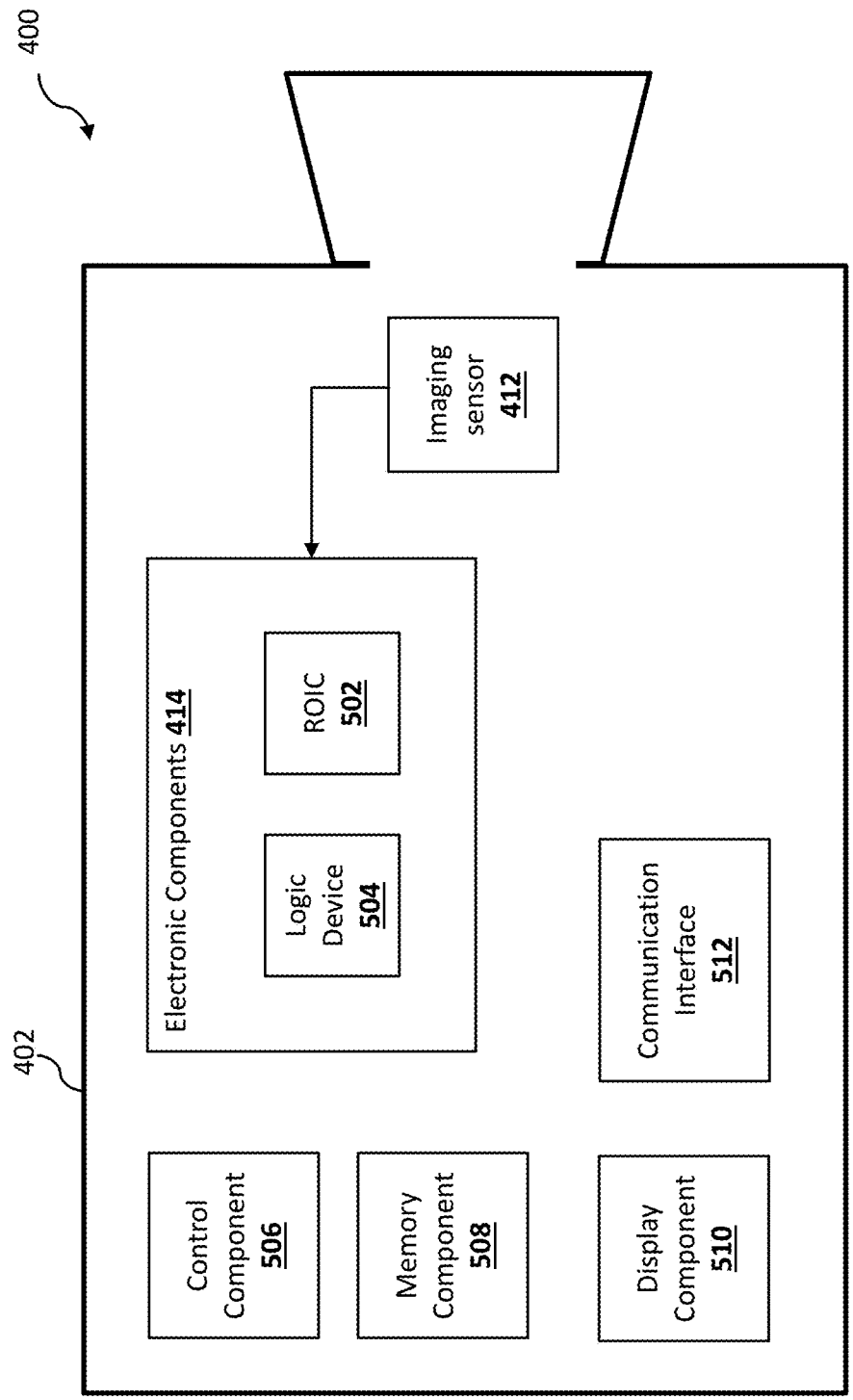
FIG. 5 is a block diagram of a thermal imaging device in accordance with an embodiment of the disclosure.

As shown, imaging sensor 412 is communicatively coupled with electronic components 414 disposed within enclosure 402 of IR imaging device 400. FIG. 5 illustrates the various electronic components of IR imaging device 400 in more detail. As shown, imaging sensor 412 is communicatively coupled with logic device 504 via readout integrated circuit 502. Readout integrated circuit 502 can be implemented by any type of integrated circuitry, and is configured to read (or accumulate) a signal (e.g., a current or voltage) indicative of the intensity of the received IR radiation at each pixel (detector) of imaging sensor 412 and then transfer the resultant signal onto output taps for readout. In some embodiments, readout integrated circuit 502 is also configured to convert the analog current signals into digital data. In other embodiments, logic device 504 is configured to read the analog output from readout integrated circuit 502 and convert the analog output to digital data. In some embodiments, the digital data includes pixel data corresponding to the pixels within an image frame or video image frame. The pixels in the image frame may or may not correspond to the pixels (detectors) on imaging sensor 412.

In one example, readout integrated circuit 502 is configured to provide a pixel value for each detector on imaging sensor 412. However, it has been contemplated that readout integrated circuit 502 may be configured to perform a pixel binning processing to further improve the signal-to-noise ratio of the IR image. For example, readout integrated circuit 502 may be configured to group adjacent detectors (e.g., a 2 by 2 detector block), take a sum or an average of the signals from those detectors, and use that value for a single pixel on the image frame. In some other embodiments, the pixel binning may be performed by logic device 504 instead of readout integrated circuit 502.

Logic device 504 may be implemented as any appropriate circuitry or device (e.g., a processor, microcontroller, application specific integrated circuit (ASIC), field-programmable gate array (FPGA), or other programmable or configurable logic devices) that is configured (e.g., by hardware configuration, software instructions, or a combination of both) to perform various operations for IR imaging device 400 as described herein. For example, logic device 504 may be configured to perform pixel binning on image signals received from imaging sensor 412 via readout integrated circuit 502 as described above. Logic device 504 may be communicatively coupled to (e.g., configured to communicate with) imaging sensor 412 (via readout integrated circuit 502), control component 506, memory component 508, display component 510, and communication interface device 512.

According to some embodiments of the disclosure, readout integrated circuit 502, logic device 504, or both may be configured to control the amount of time the signals from pixels (detectors) of imaging sensor 412 are integrated (e.g., collected) to provide corresponding pixel values (e.g., analog values or digital values) for each image frame or video image frame. For example, in microbolometer array implementations of imaging sensor 412 according to some embodiments, readout integrated circuit 502 may comprise an integrating amplifier to integrate the signals from the pixels into a desired range of amplified pixel signals representing corresponding pixel values. In this regard, readout integrated circuit 502 and/or logic device 504 according to some embodiments of the disclosure may be configured to control the duration of such signal integration (also referred to as "integration time") to provide a signal-to-noise ratio of the captured IR image that is optimized for gas imaging.

It has been contemplated to in order to further improve signal-to-noise ratio of the IR image, readout integrate circuit 502 may be configured to provide a long integration time for capturing each image frame or each video image frame. According to some embodiments of the disclosure, logic device 504 may be configured to provide an integration time of at least $\frac{1}{20}$ seconds (i.e., capturing video image frames at a speed of 20 Hz), or at least $\frac{1}{15}$ seconds (i.e., capturing video image frames at a speed of 15 Hz). In some embodiments, readout integrated circuit 502 may be configured to provide a shutter speed of at least $\frac{1}{10}$ seconds (i.e., capturing video image frames at a speed of 10 Hz). Depending on embodiments, the integration time may be controlled alternatively or additionally by logic device 504.

Additionally, it has been contemplated that limiting the range sensitivity of the detectors of imaging sensor 412 to a narrow dynamic range may improve the quality of signals obtained at the detectors. Accordingly, readout integrated circuit 502 and/or logic device 504 of some embodiments may be configured to provide a narrow dynamic range for the IR radiation intensity detectable by the imaging sensor 412, such as a dynamic range of 100 degrees Celsius, a dynamic range of 80 degrees Celsius, or even a dynamic range of 50 degrees Celsius. For example, integrating amplifiers, bias circuits, and/or other circuits of readout integrated circuit 502 may be configured such that the range of output pixel values (e.g., in analog or digital signals) in the IR image data provided by readout integrated circuit 502 corresponds to a desired narrow dynamic range (e.g., a range spanning from 0 to 50 degrees Celsius, inclusive). Additionally or alternatively, logic device 504 may be configured to convert the range of output pixel values in the image data to correspond to a desired narrow dynamic range (e.g., a range spanning from 0 to 50 degrees Celsius, inclusive).

Upon receiving image data representing image frames (or video image frames) from imaging sensor 412 via readout integrated circuit 502, logic device 504 may perform additional image processing to the image frames according to some embodiments of the disclosure to further improve the signal-to-noise ratio of the image frames. For example, logic device 504 may be configured to perform frame averaging over multiple image frames (e.g., 2, frames, 3 frames, 4 frames, etc.). Logic device 504 may perform frame averaging by generating a new image frame that takes the average value for each pixel across the multiple frames. Instead of or in addition to frame averaging, logic device 504 may also be configured to perform one or more noise reduction algorithms (such as linear smoothing filters, an anisotropic diffusion, wavelet transform, non-linear filters, etc.) on the image frames.

As shown in FIG. 5, IR imaging device 400 may also include other components such as control component 506, memory component 508, display component 510, communication interface device 512, and/or others. Control component 506 comprises, in one embodiment, a user input and/or interface device, such as a rotatable knob (e.g., potentiometer), push buttons, slide bar, keyboard, touch sensitive display devices (touch screens), and/or other devices, that is adapted to generate a user input control signal. Logic device 504 may be configured to sense control input signals from a user via control component 506 and respond to any sensed control input signals received therefrom. Logic device 504 may be configured to interpret such a control input signal as a value, as generally understood by one skilled in the art. In one embodiment, control component 506 may comprise a control unit (e.g., a wired or wireless handheld control unit) having push buttons adapted to interface with a user and receive user input control values. In one implementation, the push buttons of the control unit may be used to control various functions of IR imaging device 400, such as instructing IR imaging device 400 to begin capturing images of a scene, displaying IR images that has been captured by IR imaging device 400, and/or various other features of an imaging system or camera.

Memory component 508 comprises, in one embodiment, one or more memory devices configured to store data and information, including video image data and information. Memory component 508 may comprise one or more various types of memory devices including volatile and non-volatile memory devices, such as RAM (Random Access Memory), ROM (Read-Only Memory), EEPROM (Electrically-Erasable Read-Only Memory), flash memory, hard disk drive, and/or other types of memory. As discussed above, logic device 504 may be configured to execute software instructions stored in memory component 508 so as to perform method and process steps and/or operations described herein. Logic device 504 may be configured to store in memory component 508 video image frames or digital image data captured by the imaging sensor 412.

Display component 510 comprises, in one embodiment, an image display device (e.g., a liquid crystal display (LCD)) or various other types of generally known video displays or monitors. Logic device 504 may be configured to display image data and information (e.g., video analytics information) on display component 510. Logic device 504 may be configured to retrieve image data and information from memory component 508 and display any retrieved image data and information on display component 510. Display component 510 may comprise display circuitry, which may be utilized by the logic device 504 to display image data and information. Display component.510 may be adapted to receive image data and information directly from the imaging sensor 412 or logic device 504, or the image data and information may be transferred from memory component 508 via logic device 504. It is noted that the digital image data may be sent directly to an external device over network via communication interface 512, and in some embodiments, without being displayed on display component 510.

Communication interface device 512 may include a network interface component (NIC) or a hardware module adapted for wired and/or wireless communication with a network and with other devices connected to the network. Through communication interface device 512, logic device 504 may transmit video image frames generated at IR imaging device 400 to external devices, for example for viewing at a remote monitoring or for further processing at the external devices, and may receive commands, configurations, or other user input from external devices at a remote station. In various embodiments, communication interface device 512 may include a wireless communication component, such as a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components, such as wireless transceivers, adapted for communication with a wired and/or wireless network. As such, communication interface device 512 may include an antenna coupled thereto for wireless communication purposes. In other embodiments, communication interface device 512 may be adapted to interface with a wired network via a wired communication component, such as a DSL (e.g., Digital Subscriber Line) modem, a PSTN (Public Switched Telephone Network) modem, an Ethernet device, a cable modem, a power-line modem, etc. for interfacing with DSL, Ethernet, cable, optical-fiber, power-line and/or various other types wired networks and for communication with other devices on the wired network.

Figure 6:
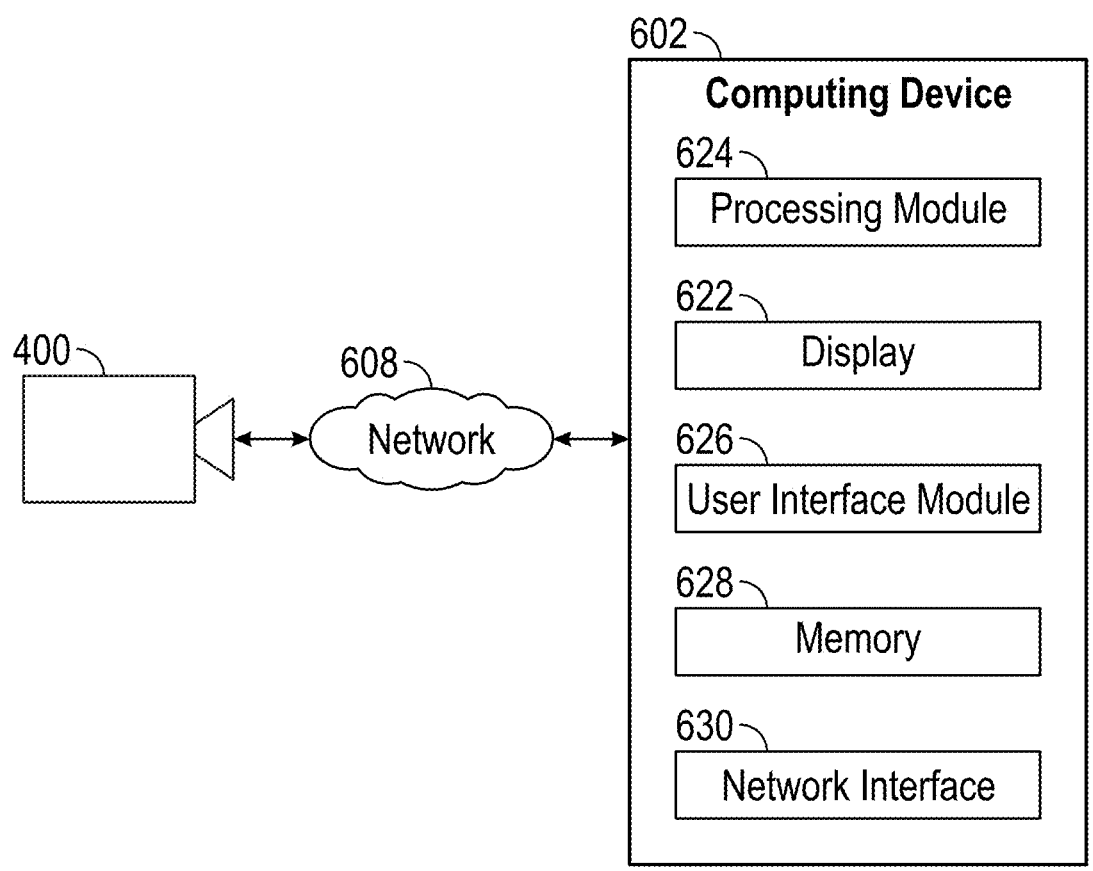
FIG. 6 illustrates a gas quantification system in accordance with an embodiment of the disclosure.

According to various embodiments of the disclosure, the gas quantification system may comprise only the imaging device (e.g., imaging device 400, in which the imaging device performs all of the functions to determine the gas leak rate. In some other embodiments however, the gas quantification system may also comprise an external computing device that is communicatively coupled with the imaging device. The external computing device may receive one or more images from the imaging device and determine the gas leak rate based on the received images. FIG. 6 illustrates an example of such a gas quantification system. Specifically, FIG. 6 illustrates a computing device 600 that may be communicatively coupled with IR imaging device 400. Computing device 600 and IR imaging device 500 may be directly connected to each other by wire or through a wireless communication protocol, or alternatively, communicatively coupled to each other over a network 608. Network 608 may comprise any type or any combination of network, such as an intranet, the Internet, a LAN, a WAN, a cellular network, etc.

Computing device 600 may be any device that includes a processor and memory that can be configured to execute software instructions to perform a set of operations (e.g., the gas quantification operations as described herein, etc.). Examples of computing device 600 include a server, a personal computer, a portable electronic device such as a mobile phone, a laptop computer, a tablet, etc. As shown, computing device 602 includes a processing module 624. Similar to logic device 504, processing module 624 may be implemented as any appropriate circuitry or device (e.g., a processor, microcontroller, application specific integrated circuit (ASIC), field-programmable gate array (FPGA), or other programmable or configurable logic devices) that is configured (e.g., by hardware configuration, software instructions, or a combination of both) to perform various operations for computing device 602 as described herein. For example, logic device 624 may be configured to perform a gas quantification process as described herein. Logic device 504 may be communicatively coupled to (e.g., configured to communicate with) user interface component 626, memory component 628, display component 622, and network interface device 630.

User interface component 626 comprises, in one embodiment, a user input and/or interface device, such as a rotatable knob (e.g., potentiometer), push buttons, slide bar, keyboard, touch sensitive display devices, and/or other devices, that is adapted to generate a user input control signal. Processing module 624 may be configured to sense control input signals from a user via user interface component 626 and respond to any sensed control input signals received therefrom. Processing module 624 may be configured to interpret such a control input signal as a value, as generally understood by one skilled in the art. In one embodiment, user interface component 626 may comprise a control unit (e.g., a wired or wireless handheld control unit) having push buttons adapted to interface with a user and receive user input control values. In one implementation, the push buttons of the control unit may be used to control various functions of computing device 602, such as instructing computing device 602 to begin displaying IR images that has been received from IR imaging device 400, performing a gas quantification process based on the received IR images, and/or various other features disclosed herein.

Memory component 628 comprises, in one embodiment, one or more memory devices configured to store data and information, including video image data and information. Memory component 628 may comprise one or more various types of memory devices including volatile and non-volatile memory devices, such as RAM (Random Access Memory), ROM (Read-Only Memory), EEPROM (Electrically-Erasable Read-Only Memory), flash memory, hard disk drive, and/or other types of memory. As discussed above, processing module 624 may be configured to execute software instructions stored in memory component 628 so as to perform method and process steps and/or operations described herein. Processing module 624 may be configured to store in memory component 628 video image frames or digital image data received from imaging device 400.

Display component 622 comprises, in one embodiment, an image display device (e.g., a liquid crystal display (LCD)) or various other types of generally known video displays or monitors. Processing module 624 may be configured to display image data and information (e.g., video analytics information) on display component 622. Processing module 624 may be configured to retrieve image data and information from memory component 628 and display any retrieved image data and information on display component 622. Display component 622 may comprise display circuitry, which may be utilized by the processing module 624 to display image data and information. Display component 622 may be adapted to receive image data and information directly from processing module 624, or the image data and information may be transferred from memory component 628 via processing module 624.

Network interface device 630 may include a network interface component (NIC) or a hardware module adapted for wired and/or wireless communication with a network and with other devices connected to the network. Through network interface device 630, processing module 624 may receive video image frames generated by IR imaging device 400, for example for viewing and/or further processing at computing device 602. In various embodiments, network interface device 630 may include a wireless communication component, such as a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components, such as wireless transceivers, adapted for communication with a wired and/or wireless network. As such, network interface device 630 may include an antenna coupled thereto for wireless communication purposes. In other embodiments, network interface device 630 may be adapted to interface with a wired network via a wired communication component, such as a DSL (e.g., Digital Subscriber Line) modem, a PSTN (Public Switched Telephone Network) modem, an Ethernet device, a cable modem, a power-line modem, etc. for interfacing with DSL, Ethernet, cable, optical-fiber, power-line and/or various other types wired networks and for communication with other devices on the wired network.

Figure 7:
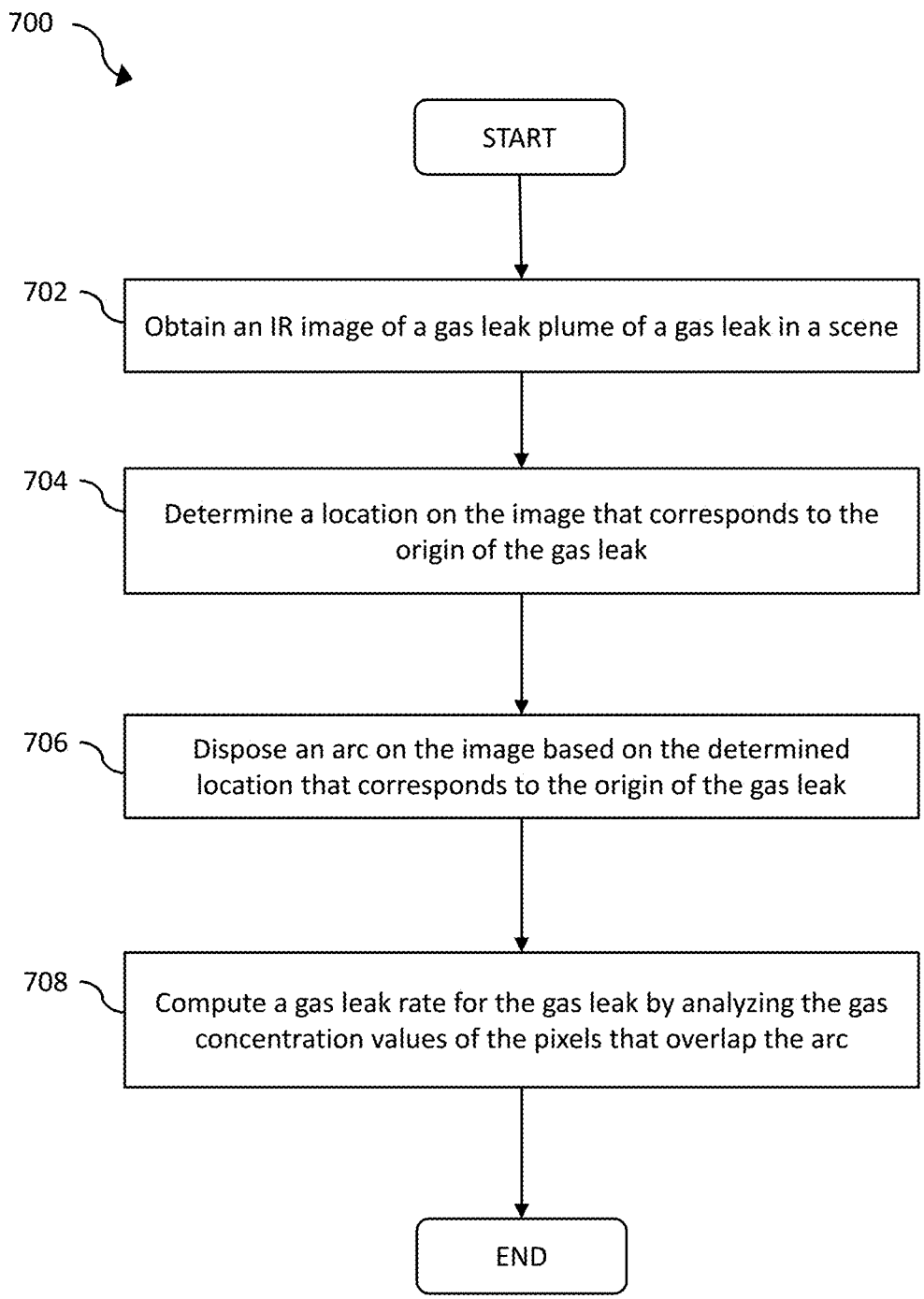
FIG. 7 illustrates a process for determining a gas leak rate in accordance with an embodiment of the disclosure.
Figure 8:
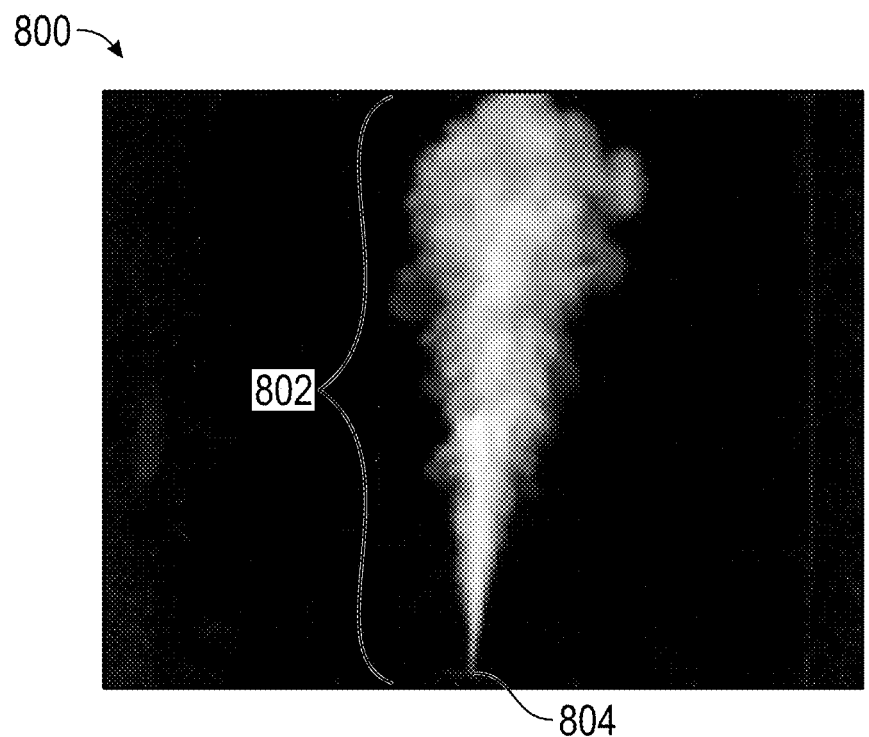
FIG. 8 illustrates an example infrared image of a gas leak in accordance with an embodiment of the disclosure.

FIG. 7 illustrates a process 700 for determining a leak rate of a gas leak based on one or more IR images captured of the gas leak. According to some embodiments of the disclosure, process 700 may be performed by imaging device 400, computing device 600, or a combination of both. Process 700 begins by obtaining (or receiving), in block 702, an IR image from an image source, such as imaging sensor 412 or imaging device 400 via network 608. The IR image may be captured of a scene (e.g., scene 105) that includes a gas leak and a gas plume generated by the gas leak. FIG. 8 illustrates an example 1R image 800 of a gas leak, which shows an origin of the gas leak 804 and a gas plume 802 produced by the gas leak. In some embodiments, the IR image includes a plurality of pixels. Each pixel has an IR radiance value that indicates an IR radiance level of a corresponding area within the scene.

As discussed above, since many types of gas that are being detected (e.g., gas that involve in gas leak incidents) have the characteristics of either absorbing or emitting thermal energy, an IR radiation path (e.g., thermal radiation path 202) that passes through such a gas will exhibit an IR radiance level different from the ambient IR radiance level, and will reflect in the IR radiance value of the corresponding pixel in the IR image. As shown in IR image 800, pixels that represent the ambient area of the scene are presented in black while pixels that represent gas plume 802 are presented in various degrees of grey colors. In this example, the extent in which the IR radiance values of the gas pixels deviate from the ambient IR radiance value indicates a gas concentration. In other words, pixels that are presented as lighter colors in this example have higher gas concentration than pixels that are presented as darker colors. Based on the difference between the IR radiance value of the gas pixels and the ambient radiance value, a gas concentration value may be determined for that pixel. In one example, the gas concentration value may be within a range of 0% and 100%, where 0% indicates no presence of the gas and 100% indicates a full saturation of the gas.

Thus, a gas concentration image is an image where each pixel has a corresponding gas concentration value derived from the pixel value of the corresponding IR image (e.g., IR image 800). Using the gas concentration value, one can determine a volume of gas in the scene based on the IR image. Since the IR image (e.g., IR image 800) presents a two-dimensional representation of the scene from the perspective of the imaging device (e.g., imaging device 170), the gas concentration value associated with a pixel represents an amount of gas detected in an extended dimension that is parallel to the optical axis of the imaging device (e.g., the third dimension) around the area of the scene associated with the pixel. In this regard, in some embodiments, each pixel of the gas concentration image may represent a sum of gas concentration along the length of a gas (e.g., a gas concentration length 242 shown in FIG. 2) in the depth of the IR image (e.g., thermal radiation paths 202 from background 110 to IR imaging device 170) for each pixel. A gas concentration image according to such embodiments may also be referred to as a gas concentration length (CL) image, gas concentration×length image, or gas-absorption-pathlength image.

The gas concentration values (or gas concentration length values in some embodiments) determined for the pixels in IR image 800 may be used to generate a gas concentration image in this step. Image 800 illustrates a simple case where the background is clean (e.g., purely black) without any distraction. Other IR image may include a busier background with noise that might not present such a clear distinction between gas pixels and non-gas pixels. To improve accuracy of such a determination, a segmentation process may be applied to the IR image 600 to identify candidate gas pixels (e.g., pixels that potentially represent gas) and non-gas pixels. According to various embodiments of the disclosure, the segmentation process may first include a thresholding process. The thresholding process uses a predetermined IR radiance threshold range (e.g., an IR radiance range that is sufficiently different from the ambient IR radiance), wherein only pixels having IR radiance values within the threshold range are considered to be valid gas pixels. In some embodiments, the IR image may be converted into a binary image, where pixels that are determined to be candidate gas pixels are assigned with one value (e.g., a white color value) and pixels that are determined to be non-gas pixels are assigned with another value (e.g., a black color value). It is noted that instead of or in addition to the thresholding process, one or more other types of segmentation algorithms may be used during the segmentation process. An example of segmentation algorithm that can be used in this process is described in a publication titled "Adaptive Background Mixture Models for Real-Time Tracking" by Stauffer and Grimson.

Figure 9:
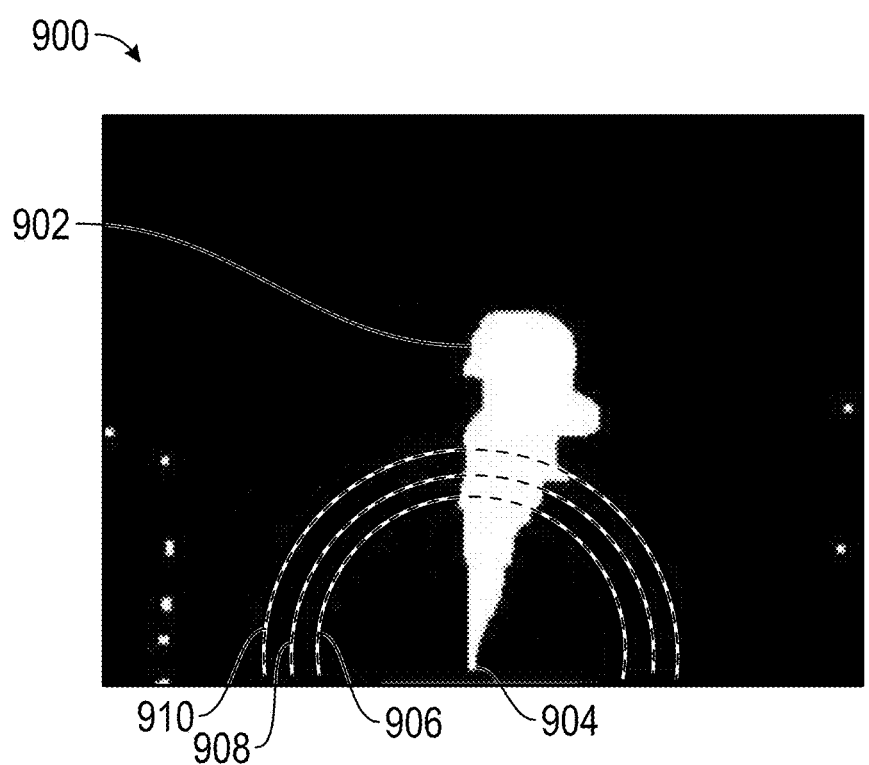
FIG. 9 illustrates a binary image generated by performing a segmentation process on an infrared image of a gas leak in accordance with an embodiment of the disclosure.

After the segmentation process, a filter (e.g., a morphological filter such as a dilation filter, an erosion filter, or a combination thereof which is also known as "opening" and "closing") may be applied to the binary image. Since a gas plume is usually solid without any holes within the plume, the morphological filter fills in any hole(s) within the pixels that represent the gas plume such that the area of the image that are determined to include gas pixels is a solid area with no holes. FIG. 9 illustrates binary image 900 that has gone through the morphological filtering process. As shown, the area 902 of the image 900 that represents the gas plume is shown in white while the remaining area is shown to be black. In this example, pixels in the original IR image 800 having corresponding pixel value as white color in binary image 900 are considered to be gas pixels and pixels in the original IR image 800 having corresponding pixel value as black color are considered non-gas pixels.

In block 704, a location on the image that corresponds to the origin of the gas leak is determined. Different embodiments use different techniques to determine such an image location. Under a manual approach, process 700 may display the IR image (e.g., on display component 510 of imaging device 400 or display component 622 of computing device 602) and prompt the user to identify an image location of the origin of the gas leak. The user may then indicate (e.g., via control component 506 of imaging device 400 or user interface module 626 of computing device 602) the image location. For example, the user may press on a touch sensitive screen at an area that corresponds to a location of the display that presents the image representation of the origin of the gas leak.

Under an automatic approach, the image location that corresponds to the origin may be determined automatically by analyzing the pixel values of the IR image. Various techniques may be used to automatically determine the gas leak origin location. In some embodiments, an optical flow velocity vector for each valid gas pixel is calculated. For example, the optical flow velocity vector of a pixel may be calculated using techniques that are described in the publication entitled "Two-Frame Motion Estimation Based on Polynomial Expansion" by Gunnar Farnebäck. Since the majority of the gas particles should be moving away from the origin of the gas leak, most of the calculated optical flow velocity vectors should be directed away from the origin of the gas leak. After extending the optical flow velocity vectors backward, the point where multiple (e.g., at least two, etc.) of the velocity vectors meet is considered to be the image location that corresponds to the origin of the gas leak.

In another example, a line detection process, such as a Hough transform, may be used to generate straight lines that connect gas pixels along the edges of the gas plume in image 900. When multiple straight lines (e.g., at least 2 straight lines) intersect at a point, that point is considered to be the image location that corresponds to the origin of the gas leak. In another example, a corner detection process (e.g., using a corner response function) may be used to detect corners in the gas plume and determine a temporally stable corner as the image location that corresponds to the origin of the gas leak. Such an automatic source localization process based on corner detection may be implemented according to the techniques disclosed in U.S. Pat. No. 7,082,370 entitled "Localization of a Point Source of a Visualized Gas Leak," which is incorporated herein by reference in its entirety.

In block 706, an exit border is placed on the IR image 800. The exit border defines a border from which all gas molecules from the leak are assumed to exit. According to various embodiments of the disclosure, only valid gas pixels that lie on the exit border are analyzed to compute (or estimate) the gas leak rate (or the leak flow), which advantageously reduce time and computational complexity of this process. Since only the valid gas pixels that lie on the exit border are analyzed for the computation (or estimation) of the gas leak rate, the placement of the exit border is important to ensure such an estimation is as accurate as possible. It has been contemplated that the exit border should be placed in an area of the image that represents the gas plume where the gas is optically thin. In other words, at least some (or all) of the valid gas pixels that lie on the exit border have gas concentration values that are not saturated, such that the concentration of the gas around the area associated with that pixel may be more accurately estimated.

According to various embodiments of the disclosure, a location for placing the exit border may be determined by separating the gas plume into two distinct regions—a logarithmic region which represents a saturated region and a linear region which represents an optically thin region—based on the rate of change in gas concentration values in a direction away from the origin of the gas leak. In the logarithmic region, the rate of change in gas concentration values is similar to a logarithmic function, while in the linear region, the rate of change in gas concentration values is substantially linear.

In some embodiments, the determination of the linear region may comprise using a straight line that intersects the location determined to correspond to the origin of the gas leak. For example, a line detection process, such as a Hough transform, may be used to determine a straight line that intersects both the determine location of the gas leak origin and a candidate (e.g., potential) gas pixel. Candidate gas pixels may be found by a segmentation process (e.g., thresholding) as described above. According to some embodiments, one or more of such straight lines may be determined. For each straight line, the differences in gas concentration values among the pixels that lie on the straight line are analyzed (e.g., using a curve fitting algorithm, etc.) to determine a logarithmic region and a linear region. It is noted that a sufficiently small gas leak may only have a linear region without any logarithmic region. In some of these embodiments, the area where the gas leak is considered to be optically thin is where the pixels are in the linear region.

The exit border may take any one of various forms, such as a straight line, a curve, or an arc. Given that a gas plume usually has an inverse cone shape, it has been contemplated that an arc border would be fitting. In some of these embodiments, the arc is part of a circle having a center at the origin of the gas leak and a radius that extends from the origin to a pixel in the optically thin region (e.g., the linear region). FIG. 9 illustrates three exit borders 906, 908, and 910 (indicated as white broken lines) that take the form of an arc. As shown, exit borders 906, 908, and 910 are arcs from three different circles, all of which have centers at around origin of the gas leak 904. It has been contemplated that one or more exit borders may be used for this computation. If more than one exit borders are used, pixels that lie on each exit border may be separately analyzed, and a gas leak rate may be separately computed for each exit border. The gas leak rates may then be compared to improve the quality of the result or to determine the quality of the result. For example, an average of the multiple computed gas leak rates may be used as the final result. In another example, the differences between the multiple computed gas leak rates (i.e., computed from different exit borders) may be used to determine or indicate the quality of the result. Even though it is shown that the exit borders 906, 908, and 910 are being placed on binary image 900, it is noted that the locations for exit borders 906, 908, and 910 may be initially determined by analyzing the concentration length (CL) image (e.g., binary image 900) (due to the use of the segmentation process), exit borders 906, 908, and 910 may subsequently be placed at the corresponding locations in IR image 800 to identify pixels from image 800 to compute the gas leak rate.

In block 708, a gas leak rate for the gas leak is computed by analyzing the pixels on the IR image that overlap the exit boarder (e.g., located along on the exit border). First, pixels from IR image 800 that overlap the exit border are identified based on the image locations that correspond with the exit border. Then, for each pixel identified to overlap the exit border, the speed and the direction of movement of the pixel may be determined (e.g., estimated). In some embodiments, an optical flow estimation may be used to calculate an optical flow velocity vector (e.g., a speed and a direction of movement) for each identified pixel on the exit border, for example, by using the techniques described in the publication entitled "Two-Frame Motion Estimation Based on Polynomial Expansion" by Gunnar Farnebäck. Thus, in this example, two frames of IR images (e.g., two consecutive frames of IR images) may be used to determine the optical flow velocity vectors.

In some embodiments, a separate segmentation process may be performed to identify valid gas pixels that overlap the exit border within IR image 800 before calculating the optical flow velocity vectors. This segmentation process according to one or more embodiments may be more advanced than the segmentation process (e.g., thresholding) in block 704 to find candidate gas pixels. For example, a suitable segmentation process in block 708 may be one that is effective at detecting motion across multiple image frames or otherwise removing background or noise pixels, such as the techniques described in the publication titled "Adaptive Background Mixture Models for Real-Time Tracking" by Stauffer et al. referenced above. In this regard, multiple image frames from the same scene that differ only temporally (preferably one taken almost immediately after the initial IR image) may be used to determine valid gas pixels on the exit border based on motion detection to remove pixels that likely represent the background or noise rather than gas.

It is beneficial to perform a separate segmentation process in this way, because a segmentation algorithm is good at detecting motion (e.g., to identify valid gas pixels and to reduce false gas pixels), while an optical flow velocity vector algorithm is good at finding the direction and speed of individual pixels. When a suitable segmentation algorithm is selected (such as one discussed above), its effect on the calculation of the optical flow velocity vectors may be determined in a controlled manner. On the other hand, if optical flow velocity vectors are calculated for all of the pixels that lie on the exit border (i.e., on arcs 906, 908, and/or 910), noise would be introduced and the quality of the resulting computed gas leak rate may suffer. That is, performing a suitable segmentation process in block 708 to remove non-gas pixels advantageously removes noise (due to background or noisy pixels) and improves the accuracy of the computed gas leak rate.

Figure 10:
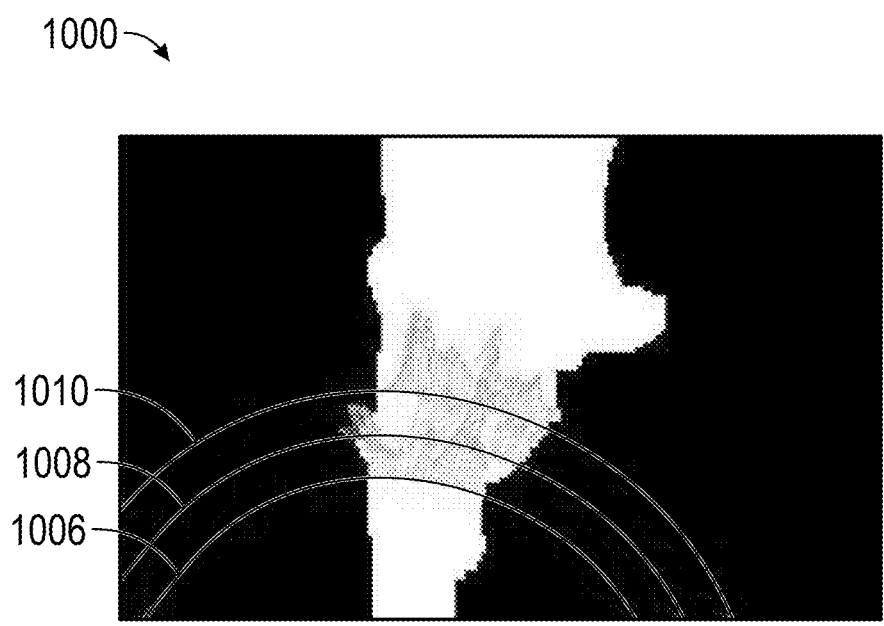
FIG. 10 illustrates optical flow velocity vectors calculated for several pixels on an infrared image of a gas leak in accordance with an embodiment of the disclosure.

Performing the optical flow velocity vectors calculation after performing the segmentation process on the IR image ensures that all valid gas pixels that overlap the exit border are included in the analysis, and the non-gas pixels are excluded from the analysis. The result may then be temporally filtered. FIG. 10 illustrates a portion of an IR image 1000 that shows visual representations of optical flow velocity vectors calculated for pixels that lie on the exit borders 1006, 1008, and 1010. The optical flow velocity vectors are shown as arrows directing from the corresponding pixels. The lengths of the arrows represent a velocity of the movement in the directions of the arrows. As may be understood, the optical flow velocity vectors are visually represented in FIG. 10 for purposes of explanation and illustration, and need not be displayed on an IR image unless desired for specific implementations.

According to one or more embodiments, a size of the area in the real-world scene covered by each pixel of the captured IR image may be used in the determination (e.g., computation) of a gas leak rate for the gas leak. As may be understood, each pixel of the captured IR image represents IR radiation from a corresponding area in the real-world scene. Thus, in one example, the size of the area covered by each pixel may be determined using the instantaneous field of view (IFOV) of the imaging system (optical elements and the detector), and the distance from the imaging system to the gas leak (which may be detected by the imaging system using, for example, the focus system (the lens position sensor) and/or the rangefinder of the imaging system as discussed above with reference to FIG. 4). For example, the size of the area covered by a pixel may be expressed as follows:

$$pixArea = (\tan(IFOV) \times d)^2$$

where pixArea is the size of the area covered by a pixel, IFOV is the instantaneous field of view, and d is the distance between the imaging system and the gas leak.

The gas leak rate (or the momentary gas leak flow) in a desired unit (e.g., liters per minute) may then be calculated using the following equation:

$$\text{leak rate} = \sum_{n=exitBorderPixels} \frac{pixArea \times imgCL(n) \times \text{velocity}(n) \times fpm}{convF} \quad (2)$$

where imgCL(n) is the gas concentration value of pixel n from the pixels or valid pixels on the exit border, velocity(n) is the optical flow velocity vector calculated for the pixel n, fpm is a imaging system parameter representing frames per minute (i.e., number of IR images captured per minute), and convF is a constant that converts the result to a desired unit of leak rate, such as liters per minutes.

According to various embodiments of the disclosure, the final gas leak quantification result may be determined by a sliding mean of several gas leak rates computed using the techniques described above based on several image frames taken over a period of time (e.g., 30 frames, 60 frames, 120 frames, etc.).

In some embodiments, additional processing may be performed during the process to further improve the quality of the final gas leak rate result. Examples of such additional processing may include filtering the optical flow velocity vectors and analyzing the statistics of the velocity vectors so that all vectors that are not directed away from the origin of gas leak are removed. This may be performed, for example, by calculating a vector from the origin point of gas leak to the tip of the optical flow vector, and determine whether this vector is shorter that the radius of the corresponding circle of the arc.

Several factors may reduce the quality of a gas leak quantification calculation. For example, strong winds may disrupt a steady flow of a gas leak, and some gas leaks may not be orthogonal to the optical axis of the camera. In such cases, it may not be possible to make a proper gas quantification measurement. However, process 700 according to some embodiments can detect these situations, e.g., by analyzing the general direction of the optical flow vectors, and notify the operator that the quality of the measurement is low.

It has been contemplated that one or more actions may be performed by the gas quantification system once the final gas leak rate is computed. For example, based on the computed gas leak rate, gas quantification system may send a signal to an external device or machinery and may cause an operation (gas transmission operation) of such external device or machinery to shut down, may cause an external device to shut down a valve of a gas pipe. In some embodiments, based on the computed gas leak rate, the gas quantification system may send an alert to an external system associated with the authority (e.g., a fire department, a police department, etc.).

Furthermore, the gas quantification system of some embodiments may modify the IR image based on the computed gas leak rate. For example, the gas quantification system may insert annotation (e.g., text that indicates the gas leak rate) on the IR image before presenting the IR image to the user. The gas quantification system may also change the color representations of the gas plume in the image according to a gas leak rate scale. In such an example, the gas quantification system may change the color representation of the gas plume to red when the gas leak rate is above a certain predetermined threshold, and change the color representation of the gas plume to blue when the gas leak rate is below the predetermined threshold.

Figure 11:
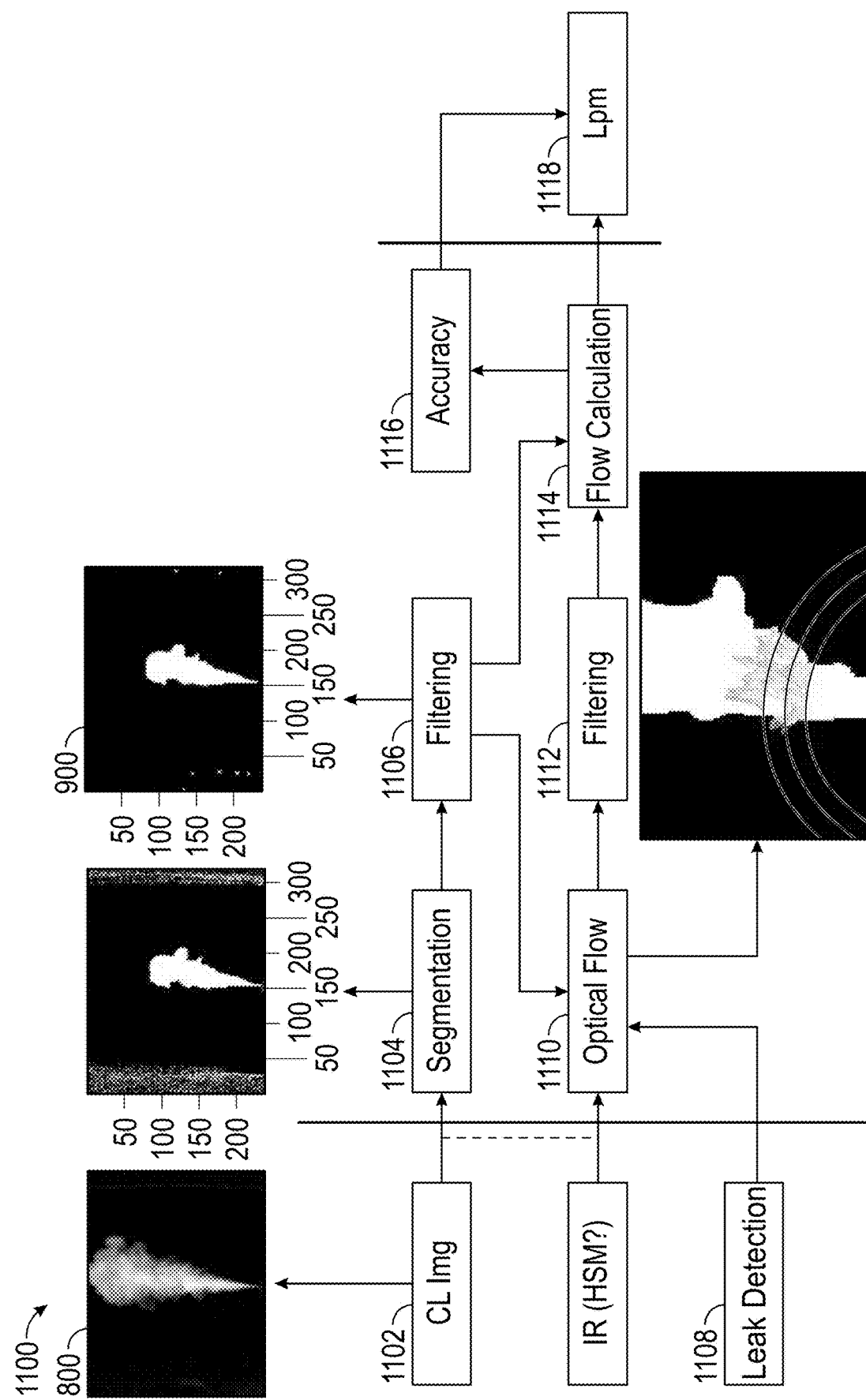
FIG. 11 illustrates a gas quantification process in accordance with an embodiment of the disclosure.

FIG. 11 illustrates a flow 1100 of the gas quantification process according to various embodiments of the disclosure. An IR image (e.g., IR image 800) is received. The pixel values of IR image 800 may be converted into gas concentration values to generate a gas concentration value image in block 1102. A segmentation process may be performed on gas concentration value image to identify candidate gas pixels and non-gas pixels within the image in blocks 1104 and 1106 to generate binary image 900. In some embodiments, the segmentation process includes thresholding (in block 1104) and filtering (such as morphological filtering in block 1106) as discussed above in connection with FIG. 9.

The image location of the origin of the gas leak may be identified in block 1108. The image location of the origin of the gas leak, along with the binary image 900, may be used to determine one or more exit borders and calculate optical flow velocity vectors for pixels that overlap the defined exit border(s) in block 1110 (e.g., similar to operations discussed above for blocks 704 and 706 of process 700). Additional filtering may be applied to the optical flow velocity vectors to filter out invalid vectors (e.g., vectors that are not directed away from the origin of the gas leak) in block 1112.

The optical flow velocity vectors are used to compute the gas leak rate in block 1114 (e.g., similar to operations discussed above for block 708 of process 700). Multiple gas leak rates may be computed based on a stream of IR images (a sequence of IR image frames that are captured during a period of time). The multiple gas leak rates may be used to improve the accuracy, for example, by taking a sliding mean of the multiple gas leak rates, in block 1116. The final gas leak rate is determined in block 1118.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Where applicable, the ordering of various steps described herein can be changed, combined into composite steps, and/or separated into sub-steps to provide features described herein.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A gas quantification system, comprising:
    a non-transitory memory; and
    a logic device coupled to the non-transitory memory, wherein the logic device is configured to read instructions from the non-transitory memory to cause the gas quantification system to perform operations comprising:

obtaining an image of a gas plume of a gas leak within a scene, wherein each pixel within the image indicates a gas concentration value corresponding to an area within the scene;

determining a location on the image corresponding to an origin of the gas leak;

disposing an exit border on the image based on the location corresponding to the origin of the gas leak, wherein the exit border comprises an arc that extends across at least a cross section of the gas plume where changes in gas concentration values are substantially linear; and computing a gas leak rate for the gas leak based at least on first gas concentration values of first pixels overlapping the exit border.

2. The gas quantification system of claim 1, wherein:
the image of the gas plume is a gas concentration length image;
each pixel of the gas concentration length image indicates a sum of gas concentration values over a length of the gas plume in a corresponding path from a background of the scene to a camera capturing the image;
the gas quantification system further comprises an infrared (IR) camera the IR camera comprises a dual waveband detector configured to capture a first IR image representing first IR radiation in a first waveband having a first IR absorption or emission rate for the gas plume and a second IR image representing second IR radiation in a second waveband having a second IR absorption or emission rate for the gas plume; and
the IR camera is configured to generate the image based on the first IR image and the second IR image.

3. The gas quantification system of claim 1, wherein the exit border is a first exit border, wherein the arc of the first exit border is a first arc, wherein the gas leak rate is a first gas leak rate,
the first arc is part of a first circle having a center at the origin of the gas leak and a radius that extends from the origin of the gas leak, and
wherein the operations further comprise:
disposing a second exit border on the image at an image location farther away from the origin of the gas leak than the first exit border, wherein the second exit border comprises a second arc having a smaller curvature than the first arc;
computing a second gas leak rate based on second gas concentration values of second pixels that overlap the second exit border; and
comparing the first gas leak rate and the second gas leak rate to determine a quality measure indicating an accuracy of at least one of the first gas leak rate or the second gas leak rate.

4. The gas quantification system of claim 1, wherein the determining of the location on the image corresponding to the origin of the gas leak comprises:
calculating a plurality of optical flow velocity vectors for a corresponding plurality of pixels within an area corresponding to the gas plume in the image; and
designating an intersection point intersected by at least two of the plurality of optical flow velocity vectors extended in reverse directions as the location that corresponds to the origin of the gas leak.

5. The gas quantification system of claim 1, wherein the operations further comprise:

obtaining a series of images including the image, the series of images being captured sequentially in time; and
the operations further comprise calculating an optical flow velocity vector for each pixel that overlaps the exit border based on at least two images from the series of images, wherein the computing of the gas leak rate is further based on the calculated optical flow velocity vectors.

6. The gas quantification system of claim 5, wherein the operations further comprise;
filtering out pixels, from the pixels that overlap the exit border, that do not likely represent gas from the gas plume; and
filtering out vectors, from the optical flow velocity vectors that are not directed away from the origin of the gas leak.

7. The gas quantification system of claim 5, wherein:
the series of images are captured by a camera with a predetermined frame rate; and
the computing of the gas leak rate is further based on the frame rate, an instantaneous field of view (IFOV) of the camera, and a distance from the camera to the gas leak in the scene.

8. The gas quantification system of claim 5, wherein the operations further comprise:
computing a plurality of gas leak rates sequentially in time using the series of images; and
computing a sliding average or mean of the plurality of gas leak rates.

9. The gas quantification system of claim 1,
wherein the operations further comprise modifying the image based on the computed gas leak rate.

10. A method of quantifying gas, comprising:
obtaining, from an infrared (IR) camera, an image of a gas plume of a gas leak within a scene, wherein each pixel within the image indicates a gas concentration value corresponding to an area within the scene;
determining a location on the image corresponding to an origin of the gas leak;
disposing an exit border on the image based on the location corresponding to the origin of the gas leak, wherein the exit border comprises an arc that extends across at least a cross section of the gas plume where changes in gas concentration values are substantially linear; and
computing a gas leak rate for the gas leak based at least on first gas concentration values of first pixels overlapping the exit border.

11. The method of claim 10, wherein:
the image of the gas plume is a gas concentration length image; and
each pixel of the gas concentration length image indicates a sum of gas concentration values over a length of the gas plume in a corresponding path from a background of the scene to the IR camera.

12. The method of claim 10, wherein the IR camera comprises a dual waveband detector, the method further comprising:
capturing, by the dual waveband detector, a first IR image representing first IR radiation in a first waveband having a first IR absorption or emission rate for the gas plume;
capturing, by the dual waveband detector, a second IR image representing second IR radiation in a second waveband having a second IR absorption or emission rate for the gas plume; and generating the image based on the first and the second IR images.

13. The method of claim 10, wherein the disposing of the exit border comprises:
determining, using a Hough transform, a straight line that intersects the location corresponding to the origin of the gas leak and a location within the gas plume in the image; and
analyzing changes in gas concentration values in pixels that lie along the determined straight line, wherein the arc of the exit border is part of a first circle having a center at the origin of the gas leak and a radius that extends from the origin of the gas leak to a location.

14. The method of claim 10, wherein the exit border is a first exit border, wherein the arc of the first exit border is a first arc, wherein the gas leak rate is a first gas leak rate, and wherein the method further comprises:
disposing a second exit border on the image at an image location farther away from the origin of the gas leak than the first exit border, wherein the second exit border comprises a second arc having a smaller curvature than the first arc;
computing a second gas leak rate based on second gas concentration values of second pixels that overlap the second exit border; and
comparing the first gas leak rate and the second gas leak rate to determine a quality measure indicating an accuracy of at least one of the first gas leak rate or the second gas leak rate.

15. The method of claim 10, wherein the determining of the location on the image corresponding to the origin of the gas leak comprises:
determining, from the image, a plurality of straight lines corresponding to edges in the gas plume; and
designating an intersection point intersected by at least two of the plurality of straight lines as the location that corresponds to the origin of the gas leak. calculating a plurality of optical flow velocity vectors for a corresponding plurality of pixels within an area corresponding to the gas plume in the image; and
designating an intersection point intersected by at least two of the plurality of optical flow velocity vectors extended in reverse directions as the location that corresponds to the origin of the gas leak.

16. The method of claim 10, further comprising:
obtaining a series of images including the image, the series of images being captured sequentially in time; and
calculating an optical flow velocity vector for each pixel that overlaps the exit border based on at least two images from the series of images, wherein the computing of the gas leak rate is further based on the optical flow velocity vectors.

17. The method of claim 16, further comprising:
filtering out pixels, from the pixels that overlap the exit border, that do not likely represent gas from the gas plume; and
filtering out vectors, from the optical flow velocity vectors that are not directed away from the origin of the gas leak.

18. The method of claim 16, wherein:
the series of images are captured by the IR camera with a predetermined frame rate; and
the computing of the gas leak rate is further based on the frame rate, an instantaneous field of view (IFOV) of the IR camera, and a distance from the IR camera to the gas leak in the scene.

19. The method of claim 16, further comprising:
computing a plurality of gas leak rates sequentially in time using the series of images; and
computing a sliding average or mean of the plurality of gas leak rates.

20. The method of claim 10, wherein:
a plurality of gas plumes from a corresponding plurality of gas leaks are captured in the image;
the determining of the location of the origin of the gas leak, the disposing of the exit border, and the computing of the gas leak rate are performed for each of the plurality of gas leaks; and
further comprising modifying the image based on the gas leak rate.

* * * * *

UNITED STATES PATENT AND TRADEMARK OFFICE
CERTIFICATE OF CORRECTION

PATENT NO. : 11,630,022 B2
APPLICATION NO. : 16/710953
DATED : April 18, 2023
INVENTOR(S) : Hugo Hedberg It is certified that error appears in the above-identified patent and that said Letters Patent is hereby corrected as shown below:

In the Specification

In the Detailed Description:

Column 14, Line 17, change "an example 1R image" to --an example IR image--.

Column 20, Line 1, change "values of 1R image 800" to --values of IR image 800--.

In the Claims

Claim 5, Column 22, Line 4, change "the operations further compromise calculating an optical flow" to --calculating an optical flow--.

Claim 15, From Column 23, Line 37 through Column 24, Line 2, Delete "calculating a plurality of optical flow velocity vectors for a corresponding plurality of pixels within an area corresponding to the gas plume in the image; and designating an intersection point intersected by at least two of the plurality of optical flow velocity vectors extended in reverse directions as the location that corresponds to the origin of the gas leak.".

Signed and Sealed this
Ninth Day of April, 2024

Katherine Kelly Vidal
*Director of the United States Patent and Trademark Office*